May 19, 1925.
G. A. BUTTRESS
1,538,087
PROCESS OF MAKING PLASTER BOARD
Filed Dec. 1, 1922
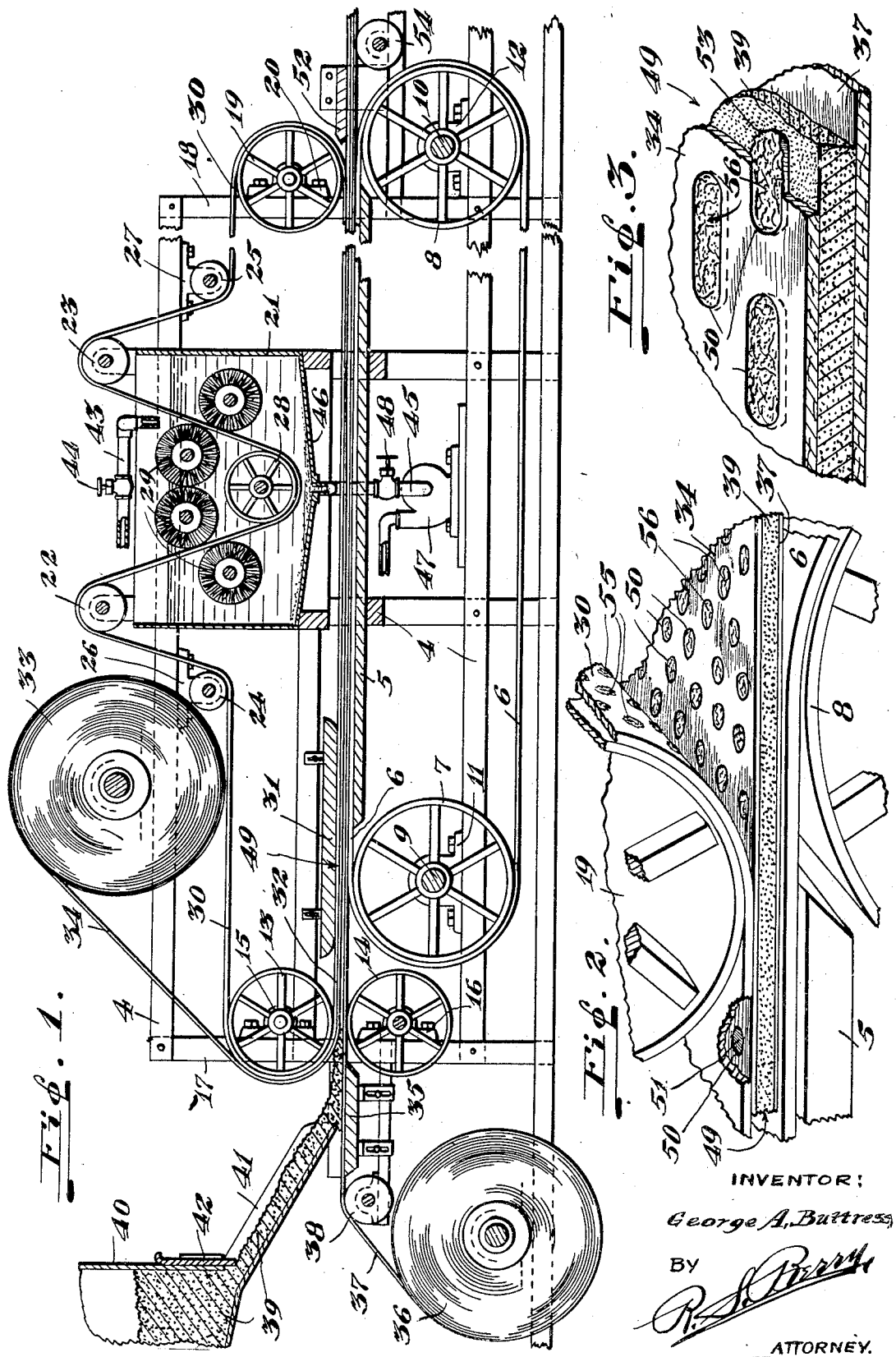
INVENTOR:
George A. Buttress
BY
ATTORNEY.

Patented May 19, 1925.

1,538,087

UNITED STATES PATENT OFFICE.

GEORGE A. BUTTRESS, OF LOS ANGELES, CALIFORNIA.

PROCESS OF MAKING PLASTER BOARD.

Application filed December 1, 1922. Serial No. 604,283.

*To all whom it may concern:*

Be it known that I, GEORGE A. BUTTRESS, a citizen of the United States, residing at Los Angeles, in the county of Los Angeles and State of California, have invented new and useful Improvements in Processes of Making Plaster Board, of which the following is a specification.

My invention relates to a process of forming plaster board and the like, and to apparatus for forming plaster board that is especially adapted to receive and hold a finishing coat of plaster as set forth in my co-pending application filed April 25, 1922, which bears Serial Number 556,385, and matured into Patent No. 1,449,728 the same being a plaster board construction provided with a backing sheet of heavy imperforate paper on which is placed a body of plastic material that is covered with a perforated facing sheet of heavy paper so that a great number of exposed plastic areas will show on the surface thereof, and formed so as to receive a finish plaster that may be applied thereto.

An object of my invention is to provide means for continuously forming a plaster board of suitable width for building purposes comprising a perforated facing sheet, an imperforate backing sheet, and a body of plastic material fixed therebetween so that small surfaces of the plastic body will be exposed on account of the perforations in the facing sheet.

Another object is to provide a continuous means for forming plaster board that will cause the exposed surface areas of the plastic body appearing on the perforated face of the plaster board to become roughened while said formed plaster board is advancing so that the exposed areas of the plastic material will be conditioned to receive a coating of a hard wall plaster or other suitable finishing material that may be applied thereon in making the finished interior walls of a building.

Another object is to provide continuous moving means for holding the plastic material in a formed shape between the backing sheet and the perforated sheet while hardening and thereafter roughening the exposed areas of the plastic body after they have become set and hardened somewhat, the operation taking place while the plastic board is moving.

A further object is to provide means whereby the means for roughening the exposed areas of the plastic body will be cleansed and be continuously presented to the plaster board being formed.

With these and other objects that may appear hereinafter my invention resides in the process and apparatus described and claimed and illustrated in the accompanying drawing in which:

Figure 1 is a view in vertical section of the apparatus used in my process of forming plaster board with parts shown in elevation.

Fig. 2 is a fragmentary perspective view of the rear end of the apparatus showing the roughening means at the point of leaving the plastic board.

Fig. 3 is a fragmentary sectional perspective view of the finished plaster board.

Referring to the drawing, 4 indicates a frame work of suitable construction to support a table 5 over which is laid a conveyor belt 6 carried by wheels 7 and 8 respectively fastened to shafts 9 and 10 journaled in bearings 11 and 12 that are adjustably secured to the frame work 4.

A pair of forming rolls 13 and 14 are spaced and journalled in bearings 15 and 16 that are adjustably mounted on the forward upright end portion 17 of the frame work 4. Said rolls 13 and 14 may be geared to the wheel shaft 9 but I prefer to show them free in this instance. Mounted on the rear upright portion 18 is a roll 19 journalled in adjustable bearings 20.

A washing tank 21 is positioned above the table 5 with its bottom spaced therefrom so as to provide for the passage of belts and formed plaster board therebetween. Rollers 22 and 23 are rotatably secured in standards above the open end of the tank 21 and rollers 24 and 25 are rotatably mounted in bearings 26 and 27 having endwise adjustment that are fastened to the frame 4 adjacent each end of the tank 21. Rotatably carried in the tank 21 is a roller 28 and radially arranged above the roller 28 is a series of brushes 29 that are also rotatably and preferably adjustably carried in the tank 21.

A continuous endless forming belt 30 is run under the forming roll 13 and under the rollers 19 and 25 over the roller 23 between some of the brushes 29, under the roller 28 and between the remaining brushes 29 over the roller 22 and under the last roller 24 to the forming roll 13, the purpose of which will later be explained in this specification.

A flat smooth pressure plate 31 is adjustably mounted above the horizontal portion 32 of the forming belt 30 running over the conveyor belt 6 and is positioned immediately behind the forming roll 13 so that a space may be maintained between the conveyor belt 6 and pressure belt 30.

As a modified construction the effect of the pressure plate 31 may be had by the substitution of a series of small rollers (not shown) positioned in the same manner as the plate 31.

Rotatably mounted above the forming rolls 13 and 14 and a little to the rear thereof on the frame 4 is a large roll of paper 33 the free end of which will be hereinafter termed the perforated facing sheet 34 that is passed between the forming rolls when in operation.

Arranged ahead of the forming rolls is a relatively short table 35 of the same construction as the table 5 and is adjustably carried on the frame 4.

Positioned and rotatably mounted on the frame 4 below the table 35 is a second roll of paper 36 the free end of which will be hereinafter termed the backing sheet 37.

A guide roller 38 is positioned above and between the paper roll 36 and table 35 over which the backing sheet 37 is run and thereafter threaded between and past the forming rolls 13 and 14 for a short distance under the portion 32 of the belt 30 and plate 31 and over the conveyor belt supported by the table 5.

The table serves as a support for the backing sheet 37 and plastic material 39 caused to flow thereon from a hopper 40 located so as to deposit the contents thereof through a chute or spout 41. The hopper 40 is provided with an outlet gate 42 so that an even flow therefrom may be maintained.

A water supply pipe 43 provided with a valve 44 is led to the top of the tank 21. A drain pipe 45 is fixed to the bottom 46 of the tank 21 and is connected to a pump 47 here shown as one of a centrifugal type, there being a valve 48 placed between the tank 21 and pump 47, so that the contents of the tank may be drained and pumped away.

The elements of the apparatus having been described, the operation, functioning and purpose will now be explained. From the foregoing the sheets of paper 34 and 37 now being in the working position, the gate 42 of the hopper 40 may be raised to allow the plastic material 39 contained therein to flow through the chute 41 to the paper 37 supported on the table 35. After a sufficient quantity of plastic material has spread over the surface of the sheet 37 the sheets 34 and 37 and the plastic material 39 are pulled or advanced between the forming belt 30 and conveyor belt 6 the rolls 13 and 14 are rotated so as to evenly feed and convey the sheets 34 and 37 and plastic material 39 continuously between the belt 30 and conveyor belt 6. The rolls 13 and 14 press and form the plastic material 39 between the sheets of paper 34 and 37, the table 5 supports the conveyor belt 6 and the pressure plate bears on the forming belt 30 so the formed soft uncured plaster board 49 passing therebetween will be held as formed by the rolls 13 and 14 while it advances.

As the formed plaster board passes with the conveyor belt and pressure belt over the table 5 it is setting to a certain extent according to the length of time that it takes to traverse the length of the table and also drying according to the degree of temperature. While this is taking place the plaster 39, squeezed into the perforations 50 of the facing sheet 34 will adhere to the pressure belt 30 due to the adhesive properties of the plaster 39 and the pressure of the plate 31 which plate may be elongated to obtain a greater and more uniform adhesion.

By referring to Fig. 2 it will be seen that as the horizontal portion 32 of the belt 30 that is in contact with the plaster board 49 reaches the roller 19 it must turn upwardly and follow the roller 19 over which it is lead; as this action takes place the plaster board 49 adhesively held to the belt by the several areas 51 of plaster 39 filling the apertures 50 of the facing sheet 34 will tend to travel with the pressure belt 30, but due to its stiffness from setting and by prevention from a guide bar 52 its contact is broken so that it advances straight ahead.

The means of separation, producing a roughened surface on the exposed plaster is the essence of my invention as the plaster 39 is a composition that has no defined grain or parting layers, it must break according to the slight differences in degree of adhesion to the belt 30 and of the plaster 39, in other words the stubs or portions of plaster 53 extending into and filling the apertures 50 of the facing sheet 34 will be broken away along an uneven line from the main body or core of plaster 39 held between the facing sheet 34 and backing sheet 37.

In practice I have found that the plaster 39 in drying while advancing and in contact with the pressure belt 30 adheres so strongly thereto as to break from the main body of plaster 39 so that a portion of the stub or plaster projecting from the plaster core that still adheres to the pressure belt 30 will be carried away on the pressure belt 30, thereby giving an uneven surface to the exposed areas of plaster 51 appearing through the perforations 50 of the facing sheet that were formed therein and that had smooth flat surfaces before the pressure belt 30 had broken away. After the contact of the plaster board has been broken the plaster board continues to advance over rollers 54, while the belt 30 continues upwardly under the roller 25 and over the roller 23 and into the tank 21.

The endless belt is threaded through the rollers and brushes and will pass through the tank each time a given point is measured on the advancing plaster board 49. The belt 30 is studded with pieces of plaster 55 after leaving the plaster board 49 that have adhered thereto while breaking from the stubs of plaster 53. The tank 21 is provided for the purpose of washing the pieces of plaster 55 from the surface of the belt 30. As the belt 30 enters the tank 21 it passes between rotating brushes 29 that may turn in opposite directions so that the belt 30 is dampened and scrubbed while passing downwardly, after which it passes under roller 28 and then upwardly through the remaining brushes 29 to be further scrubbed and thereafter passes out of the tank 21 over roller 22 and under the roller 24 to the forming roll 13. By this means the belt is cleansed and will be continuously presented with a smooth surface to the perforated sheet 34.

In Fig. 3, I have shown a fragment of plasterboard as produced by the apparatus with a portion of the perforated sheet broken away to show the stub of plaster with an uneven and roughened surface 56.

It is intended that the various rollers may be geared (not shown) or powered to rotate according as practice may deem necessary, and that suitable gearing or means (not shown) to cause the brushes to rotate.

Thus by my process and apparatus for forming plaster board I am able to produce plaster board sheets in a continuous manner with exposed areas of the plaster core or body having roughened surfaces below the surface of the facing sheet that is adapted to receive and retain a finishing coat of plaster that may be applied thereon.

Various changes may be made in the form, construction, and the principles of operation of the apparatus herein described without affecting the method of continuously forming the plaster board coming within the scope of the appended claims.

I claim:

1. The process of making plaster board consisting in placing plastic material on an imperforate backing sheet of paper, laying a facing sheet of paper thereover having perforations, advancing the sheets and plastic material between moving endless belts and spaced forming rolls, maintaining a pressure on the formed plaster board after it has passed between said forming rolls so that said plastic material squeezed into said perforations will adhere to one of said belts that is in contact with said perforated facing sheet, further advancing said formed plaster board, and thereafter breaking the contact between said plaster adhering to said belt so as to produce a roughened and uneven surface on said plaster filling said perforations of said facing sheet.

2. The herein described method of forming plaster board consisting in placing a sheet of imperforate backing paper on a base, depositing and evenly distributing plastic material thereon, placing a perforated facing sheet thereover, advancing the sheets and plastic material between endless belts and spaced forming rolls, maintaining a pressure on the formed plaster board while it is advancing with said endless belts so that the plastic material will enter the perforations and adhere to said endless belt in contact with said perforated facing sheet, further advancing said formed plaster board, and thereafter breaking the contact between said endless belt and plaster board so that the plaster pressed into the apertures of the facing sheet will be given a roughened and uneven surface.

3. The herein described method of forming plaster board consisting in placing a sheet of imperforate backing paper on a base, depositing and evenly distributing plastic material thereon, placing a perforated facing sheet thereover, advancing the sheets and plastic material between endless belts and forming rolls, maintaining a pressure on the formed plaster board while it is advancing with said endless belts so that the plastic material will enter the perforations and adhere to the endless belt contacting said perforated facing sheet, thereafter breaking the contact between said endless belt and plaster board whereby the plaster pressed into said apertures of the facing sheet will be given a roughened surface, and then cleansing said endless belt.

4. The method of forming a composition wall board consisting in interposing a body of plastic material between a backing sheet and a perforated facing sheet to form a panel, pressing the facing sheet upon the plastic body to cause portions of the plastic body to project into the apertures in the facing sheet to form exposed surfaces of the plastic body substantially flush with the outer surface of the facing sheet at the margin of the apertures therein, and roughening the exposed surfaces of the plastic body.

5. The method of forming plaster board consisting in covering a plastic body with a perforate facing sheet, and bringing a surface in and out of contact with the areas of plastic exposed through the perforations in the facing sheet before the plastic body has set whereby the surfaces of said areas will be roughened.

6. In a machine for forming a composition wall board, means for interposing a body of plastic material between a backing sheet and a perforated facing sheet to form a panel, means for causing portions of the plastic body to project into the apertures in the facing sheet and form exposed surfaces of the plastic body substantially flush with the outer surface of the facing sheet at the margin of said apertures, and means for roughening the exposed surfaces of the plastic body.

7. In a machine for forming plaster board, a frame, a pair of forming rolls carried by the frame, an endless pressure belt passing around one of said forming rolls, an endless conveyor belt positioned beneath said endless pressure belt, means for feeding an imperforate sheet and a plastic body between said forming rolls, means for feeding a perforated sheet between said forming rolls under said pressure belt and over said plastic body to form a board, means for pressing the board after it has passed said forming rolls, means for parting said pressure belt from said board so as to produce a roughened and uneven surface to said plaster in said apertures, and means for washing and scrubbing said pressure belt.

8. A machine for forming plaster board, means for depositing a plastic material between a backing sheet and a perforated facing sheet, means for forming said plastic material between said sheets, means for maintaining a pressure on said formed plastic material and sheets so that said plastic material will adhere to said pressure means through the perforations in said facing sheet and means for breaking the contact between said pressure means and said plastic material before the latter is set.

9. A machine for forming plaster board, means for depositing a plastic material between a backing sheet and a perforated facing sheet, means for forming said plastic material between said sheets, means for maintaining a pressure on said formed plastic material and sheets so that said plastic material will adhere to said pressure means, means for breaking the contact between said pressure means and said plaster board and means for cleansing said pressure means.

10. The herein described method of forming plaster board consisting in placing a sheet in perforated backing paper on a base, depositing and evenly distributing plastic material thereon, placing a perforated facing sheet thereover, advancing the sheets and plastic material between endless belts and forming rolls, maintaining a pressure on the formed plaster board while it is advancing with said endless belts so that the plastic material will enter the perforations and adhere to one of said endless belts in contact with said perforated facing sheet, further advancing said formed plaster board, thereafter breaking the contact between said endless belt and plaster board so that the plaster pressed into said apertures of said facing sheet will be given a roughened and uneven surface from the breaking away of pieces of said plaster adhering to said belt that were broken from said plaster, and then washing and scrubbing said endless belt to remove said pieces of plaster from said belt.

11. The process of making plaster board which consists in pressing a surface sheet having openings therethrough on to plastic material, with a removable sheet above said surface sheet to overlie said openings, and in removing said removable sheet afterwards.

12. The process of manufacturing plaster board which consists in forming plastic material into layers between two surface sheets, one of which is provided with openings therethrough, and in causing the plastic material at the openings to be hollowed inwardly, for the purpose referred to.

13. The herein described process of manufacturing plaster board which consists in rolling a sheet of surface material having openings therein onto plastic material to form a flat body and in providing a cover sheet above said sheet of surface material as it is pressed onto said plastic material, and in removing said cover sheet thereafter to remove a small portion of the plastic material through said openings.

14. The process of making plaster board which consists in forming plastic material into sheets between two sheets of paper, one sheet of which paper is provided with openings therethrough, and in passing said plastic material and said surface sheets under means adapted to confine the plastic material and to form a hollowed condition thereof at each opening, whereby to provide means for forming a bond between said plaster board and a coat of plaster to be applied thereto.

GEORGE A. BUTTRESS.